United States Patent [19]
Miki et al.

[11] Patent Number: 5,397,638
[45] Date of Patent: Mar. 14, 1995

[54] RESIN-COATED STEEL SHEET HAVING GOOD ELECTROCOATABILITY AND WELDABILITY

[75] Inventors: Kenji Miki; Hirohiko Sakai, both of Kakogawa, Japan

[73] Assignee: Kabushiki Kaisha Kobe Seiko Sho, Kobe, Japan

[21] Appl. No.: 47,077

[22] Filed: Apr. 16, 1993

Related U.S. Application Data

[63] Continuation of Ser. No. 845,941, Mar. 4, 1992, abandoned.

[51] Int. Cl.⁶ .................. B32B 15/08; B32B 15/18; B32B 27/40
[52] U.S. Cl. .................. 428/328; 428/330; 428/331; 428/341; 428/425.8; 428/425.9; 428/450; 428/469
[58] Field of Search ......... 428/328, 330, 331, 425.8, 428/425.9, 447, 450, 457, 341, 469, 340

[56] References Cited

U.S. PATENT DOCUMENTS

| | | | |
|---|---|---|---|
| 3,309,261 | 3/1967 | Schiller et al. | 428/425.8 X |
| 3,779,794 | 12/1973 | DeSantis | 428/425.8 X |
| 4,788,269 | 11/1988 | Vu et al. | 528/60 |
| 4,818,777 | 4/1989 | Braig | 524/83 |
| 4,855,185 | 8/1989 | Vu et al. | 428/423.1 |
| 4,880,890 | 11/1989 | Miyabayashi et al. | 528/45 |
| 4,880,891 | 11/1989 | Miyabayashi et al. | 528/45 |
| 5,102,457 | 4/1992 | Braig et al. | 106/14.16 |

FOREIGN PATENT DOCUMENTS

| | | |
|---|---|---|
| 0035316 | 9/1981 | European Pat. Off. |
| 0158893 | 10/1985 | European Pat. Off. |
| 0343523 | 11/1989 | European Pat. Off. |
| 0385880 | 9/1990 | European Pat. Off. |
| 0423740 | 4/1991 | European Pat. Off. |
| 2211762 | 7/1989 | United Kingdom |
| WO87/01622 | 3/1987 | WIPO |

*Primary Examiner*—D. S. Nakarani
*Attorney, Agent, or Firm*—Oblon, Spivak, McClelland, Maier, & Neustadt

[57] ABSTRACT

A resin-coated steel sheet having good electrocoatability and weldability, characterized in that the resin coating is formed on the layer of zinc plating or zinc alloy plating (with or without subsequent chromate treatment) and is composed mainly of urethane resin containing (a) either colloidal silica or a silane coupling agent and (b) a phosphate of Al, Ba, Ca, Co, Fe, Mg, Mn or Zn in an amount of 0.01–35 wt % (with or without an additional organic pigment fine powder in an amount of 0.01–40 wt %).

9 Claims, 1 Drawing Sheet

RESIN-COATED STEEL SHEET HAVING GOOD ELECTROCOATABILITY AND WELDABILITY

This application is a continuation of application Ser. No. 07/845,941, filed on Mar. 4, 1992, now abandoned.

BACKGROUND OF THE INVENTION

1. Field of the Invention

The present invention relates to a resin-coated steel sheet, more particularly, to a resin-coated steel sheet having good electrocoatability and weldability which is suitable for automotive bodies and household electric appliances.

2. Description of the Prior Art

There are increasing requirements for more corrosion resistance than before in automotive bodies and household electric appliances. These requirements are met by replacing conventional cold-rolled steel sheets and plated steel sheets with surface-treated steel sheets having much better corrosion resistance.

There are known several kinds of surface-treated steel sheets, which include zinc plated steel sheets, zinc alloy-plated steel sheets (said zinc alloy containing one or more elements such as Ni, Fe, Mn, Mo, Co, and Al), multilayer-plated steel sheets, and resin-coated steel sheets formed by coating zinc-plated or zinc alloy-plated steel sheets with a chromate layer and resin film. These conventional resin-coated steel sheets, however, still lack satisfactory electrocoatability, corrosion resistance, and spot-weldability.

There is disclosed a zinc-rich coated steel sheet in Japanese Patent Publication Nos. 24230/1970 and 6882/1972. It is receptive to electrodeposition but is poor in corrosion resistance, press formability, and weldability. There is disclosed a resin-coated steel sheet, with the resin containing an electrically conductive inorganic pigment, in Japanese Patent Publication No. 44569/1977 and Japanese Patent Laid-open Nos. 138758/1983 and 79138/1976. The resin coating film on a zinc-plated steel sheet improves corrosion resistance and weldability but suffers from a disadvantage that the electrocoating film formed thereon is poor in surface smoothness because the inorganic pigment contains comparatively coarse particles.

There is proposed an organic composite silicate thin film (0.3–3 μm thick) free of electrically conductive inorganic pigments, in Japanese Patent Laid-open Nos. 224174/1983, 33192/1985, and 174879/1985. It is receptive to electrodeposition and exhibits improved corrosion resistance, weldability, and press formability; however, it does not permit a smooth electrocoating film to be formed thereon.

SUMMARY OF THE INVENTION

The present invention was completed to address the above-mentioned problems involved in conventional resin-coated steel sheets. Accordingly, it is an object of the present invention to provide a resin-coated steel sheet having good electrocoatability and weldability.

The present invention is embodied in a resin-coated steel sheet having good electrocoatability and weldability, characterized in that the resin coating is formed on the layer of zinc plating or zinc alloy plating and is composed mainly of urethane resin containing (a) either colloidal silica or a silane coupling agent and (b) a phosphate of Al, Ba, Ca, Co, Fe, Mg, Mn or Zn in an amount of 0.01–35 wt %.

DETAILED DESCRIPTION OF THE INVENTION

Figure 1:
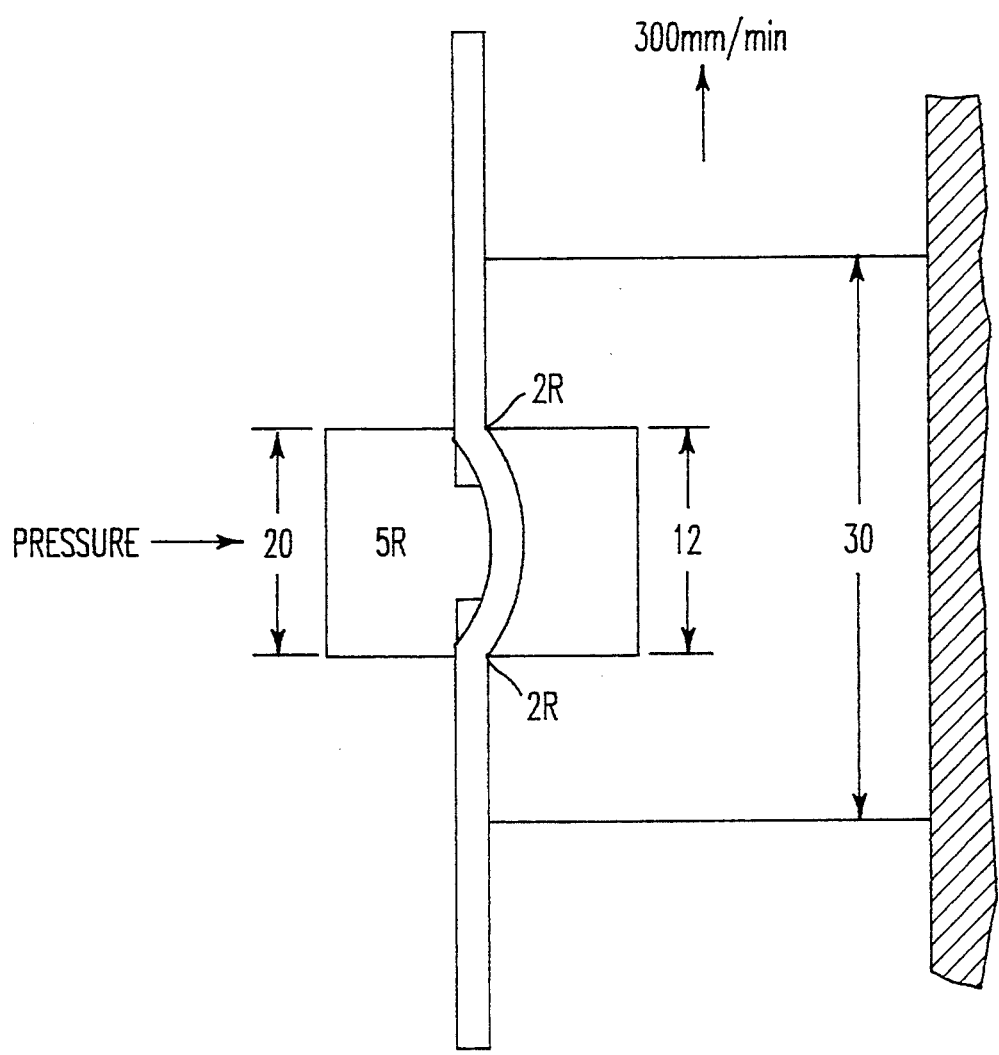
FIG. 1 is a schematic illustration of a draw bead tester which is used to examine a test piece for corrosion resistance after working.

According to the present invention, the resin coating film is composed mainly of urethane resin. The urethane resin is defined as a polymer which is obtained by polymerization of a polyisocyanate and a polyhydric hydroxyl compound in the presence of a polyfunctional amine as a curing agent. Usually, it is produced in two steps, the first step involving the reaction between a polyisocyanate and a polyhydric hydroxyl compound which gives rise to a urethane prepolymer, and the second step involving the reaction of the prepolymer in the presence of a curing agent.

There are no specific restrictions on the above-mentioned polyisocyanate; it includes aliphatic, aromatic, and/or alicyclic polyisocyanates, and dimers or trimers thereof, such as tolylene diisocyanate, diphenylmethane diisocyanate, polymethylene polyphenyl polyisocyanate, hexamethylene diisocyanate, xylylene diisocyanate, naphthalene diisocyanate, tolidine diisocyanate, isophorone diisocyanate, hydrogenated xylylene diisocyanate, and hydrogenated dicyclohexylmethane diisocyanate.

There are no specific restrictions on the above-mentioned hydroxyl compound; it includes polyether polyols (such as polyalkylene glycol, polyamine polyol, polymer polyol, and polytetramethylene glycol), polyester polyols (such as adipate polyol, phthalate polyol, and polycarbonate polyol), and polyhydric alcohols (such as trimethylolpropane and butanediol).

There are no specific restrictions on the above-mentioned polyfunctional amine compound as a curing agent; it includes, for example, methylene-o-chloroaniline, diaminodiphenylmethane, ethylenediamine, diethylenetriamine, hydrazine, isophoronediamine, and triethylenetetramine.

According to the present invention, the urethane resin should be an aqueous urethane resin having hydrophilic groups in the molecule. If necessary, it may be emulsified into water by the aid of an emulsifier.

There are known several kinds of aqueous resin coating materials such as epoxy resin-based ones and acrylic resin-based ones. However, they give rise to a resin coating film which is poor in electrocoatability and corrosion resistance after working.

According to the present invention, the resin coating film contains colloidal silica or a silane coupling agent. Examples of the latter include γ-mercaptopropyltrimethoxysilane and γ-aminopropyltrimethoxysilane.

The colloidal silica or silane coupling agent improves the corrosion resistance of the resin coating film. The silane coupling agent should preferably be contained in an amount of 1–40 parts by weight for 100 parts by weight of the urethane resin. With an amount less than 1 part by weight, the silane coupling agent does not improve the corrosion resistance of the resin coating film. With an,amount in excess of 40 parts, the silane coupling agent is wasted without any additional effect. The colloidal silica should preferably be contained in an amount of 5–80 parts by weight for 100 parts by weight of the urethane resin. With an amount less than 5 parts by weight, the colloidal silica does not improved the corrosion resistance of the resin coating film. With an amount in excess of 80 parts by weight, the colloidal silica makes the resin coating film excessively hard and hence poor in corrosion resistance after working.

According to the present invention, the resin coating film contains, in addition to the above-mentioned colloidal silica or silane coupling agent, a phosphate of Al, Ba, Ca, Co, Fe, Mg, Mn, or Zn in the form of fine powder which is insoluble or slightly soluble in water, in order to improve the weldability. The phosphate effectively prevents the tip from wearing during welding. In the present invention, the phosphate should preferably be in the form of fine powder having an average particle diameter smaller than 3 $\mu$m. With an average particle diameter larger than 3 $\mu$m, the phosphate roughens the surface of the resin coating film and hence lowers the electrocoatability and corrosion resistance.

The above-mentioned phosphate should be contained in an amount of 0.01-35 wt % of the resin coating film. With an amount less than 0.01 wt %, the phosphate does not improve the weldability. With an amount in excess of 35 wt %, the phosphate makes the resin coating film poor in adhesion and lowers the corrosion resistance after working and the adhesion of electrocoating film.

In general, it is important for resin-coated steel sheets that the resin coating film is electrically conductive. This requirement is usually met by incorporating the resin coating film with an electrically conductive inorganic pigment. However, such an inorganic pigment roughens the surface of the resin coating film, as mentioned above. On the other hand, without an electrically conductive inorganic pigment, the resin coating film has such a high electrical resistance that a large welding current is required which wears the tip, reducing the number of spot weld points that can be achieved continuously.

By contrast, owing to the phosphate fine powder contained therein, the resin coating film in the present invention provides greatly improved spot welding performance as well as good electrocoatability. The improved spot welding performance is presumably due to the ability of phosphate fine particles to break the resin coating film at the time of spot welding, thereby greatly lowering the resistance of the resin coating film, which results in an easy flow of electric current. The above-mentioned effect of the phosphate on the improved electrocoatability is not yet completely elucidated. A conceivable reason for it is that the phosphate particles partly decompose into finer particles at the time of baking after coating.

According to the present invention, the resin coating film should preferably contain an organic pigment fine powder in an amount of 0.01-40 wt %. The organic pigment fine powder should preferably have an average particle diameter smaller than 1 $\mu$m. With an average particle diameter larger than 1 $\mu$m, the organic pigment powder will give rise to a resin coating film with a rough surface, which leads to an electrocoating film having surface irregularities, as in the case of the electrically conductive inorganic pigment mentioned above.

According to the present invention, the amount of the organic pigment should be 0.01-40 wt % of the resin coating film. With an amount less than 0.01 wt %, the organic pigment does not improve the electrocoatability. With an amount in excess of 40 wt %, the organic pigment makes the resin coating film poor in adhesion and corrosion resistance after working.

As in the case of welding, it is important for electrocoating that the resin coating film be electrically conductive. If the resin coating film is incorporated with an electrically conductive inorganic pigment to meet this requirement, the resulting resin coating film is poor in surface smoothness and hence the electrocoating film formed thereof has marked surface irregularities, as mentioned above. In addition, the inorganic pigment usually has a high specific gravity and hence is poor in dispersibility in the coating material. Uneven dispersion of the inorganic pigment particles leads to localized current passages, which results in the surface irregularities of the electrocoated film. On the other hand, if the resin coating film is not incorporated with an electrically conductive inorganic pigment, the resin coating film has such a high electrical resistance that localized current flows take place and the resulting electrocoated film has marked surface irregularities.

The foregoing problem is avoided if the resin coating film is incorporated with an organic pigment fine powder according to the present invention. The organic pigment fine powder forms a myriad of fine irregularities which are uniformly distributed on the coating film. These irregularities permit current to pass uniformly at the time of electrocoating. This results in uniformly distributed current flows which contribute to the formation of the smooth electrocoating film.

According to the present invention, the resin coating film should be formed in an amount of 0.1-1.0 g/m$^2$. With an amount less than 0.1 g/m$^2$, the resin coating film does not provide sufficient corrosion resistance. With an amount in excess of 1.0 g/m$^2$, the resin coating film has an adverse effect on the spot weldability.

According to the present invention, there are no specific restrictions on the steel sheet so long as it is a zinc plated steel sheet or zinc alloy plated steel sheet produced in the usual way.

According to the present invention, the above-mentioned resin coating film may be formed on a chromate film. The chromate film adds to corrosion resistance, although it slightly lowers the weldability. The amount of the chromate film should be 10-150 mg/m$^2$, preferably 30-80 mg/m$^2$, (in terms of chromium) on one side.

EXAMPLES

The invention will be described with reference to the following examples, which are not intended to restrict the scope of the invention.

Example 1

A 0.8 mm thick cold rolled steel sheet, which had undergone degreasing and pickling in the usual way, was electroplated with Zn—Ni alloy (20 g/m$^2$) using a sulfuric acid bath.

One part of the electroplated steel sheet underwent chromate treatment which consisted of the application of an aqueous solution of 40 wt % reduced chromic acid, followed by oven drying at 150° C. for 1 minute, with the total chromium amount being 40-80 mg.

Both the Zn—Ni alloy plated steel sheet (without chromate treatment) and the plated and chromate-treated steel sheet were coated with a urethane resin solution using a bar coater to form a coating film thinner than 2 $\mu$m, which was subsequently baked at 180° C. for 1 minute. Thus there were obtained two kinds of resin coated steel sheets. The urethane resin solution contains a silane coupling agent or colloidal silica and a phosphate as shown in Table 1. The samples were evaluated in the following manner. The results are shown in Table 1.

Continuous spot weldability
Tested under the following conditions.
Electrode tip diameter: 6 mm, FC
Pressure: 200 kgf
Current: 9 kA
Time: 10 cycles
Electrocoatability The samples were coated with a cationic electrocoating paint to form a 15-μm thick film. The samples were further coated with an automotive surfacer and top coat by spraying to form a 35-μm thick film each, followed by baking.

After immersion in hot water (50° C.) for 240 hours, the coated samples underwent cross-cut adhesion test. The results are expressed in terms of number of cross-cuts remaining unremoved out of 100 cross-cuts.

TABLE 1

| Run No. (Comparative run No.) | Amount of chromium (mg/m$^2$) | Silane coupling agent (pbw)[1)2)] | Colloidal silica (pbw)[1)] | Amount of resin coating film (g/m$^2$) | Phospate Kind | Conc. (%) | Size (μm)[5)] | Number of spot weld points | Electro-coatability (V) | Corrosion resistance after working (μm) | Film adhesion |
|---|---|---|---|---|---|---|---|---|---|---|---|
| 1 | — | A 5 | 20 | 0.5 | Ca salt | 0.01 | 2.5 | more than 5000 | 280 | 150 | 100/100 |
| 2 | 70 | A 10 | 20 | 0.6 | Fe salt | 0.50 | 1.1 | more than 5000 | 260 | 50 | 100/100 |
| 3 | 40 | A 30 | 20 | 0.1 | Ba salt | 1.25 | 0.8 | more than 5000 | 260 | 80 | 100/100 |
| 4 | 10 | B 20 | 10 | 1.0 | Co salt | 5.70 | 3.0 | more than 5000 | 280 | 90 | 100/100 |
| 5 | 150 | B 30 | 30 | 0.7 | Mg salt | 10.3 | 0.6 | more than 5000 | 260 | 70 | 100/100 |
| 6 | 100 | C 20 | 60 | 0.3 | Zn salt | 21.2 | 2.4 | more than 5000 | 260 | 60 | 100/100 |
| 7 | 80 | C 30 | 40 | 0.9 | Al salt | 34.8 | 1.5 | more than 5000 | 260 | 70 | 100/100 |
| (8) | 100 | B 5 | 15 | 1.0 | K salt | 10.0 | 1.2 | less than 2000 | 220 | 120 | 95/100 |
| (9) | 80 | B 20 | 30 | 0.8 | Na salt | 23.5 | 2.4 | less than 2000 | 180 | 240 | 85/100 |
| (10) | 70 | B 40 | 20 | 0.6 | Fe salt | 0.008 | 0.5 | less than 2000 | 220 | 95 | 100/100 |
| (11) | 90 | C 20 | 40 | 0.7 | Mg salt | 40.0 | 0.05 | more than 5000 | 240 | 370 | 55/100 |
| (12) | 40 | C 30 | 20 | 1.0 | Al salt | 5.0 | 3.5 | more than 5000 | 200 | 320 | 100/100 |
| (13) | 20 | C 40 | 50 | 0.05 | Zn salt | 12.0 | 2.6 | more than 5000 | 260 | 380 | 100/100 |
| (14) | 100 | A 10 | 70 | 1.2 | Co salt | 24.0 | 1.1 | less than 2000 | 240 | 15 | 100/100 |
| (15)[3)] | 90 | A 40 | 80 | 0.7 | Mg salt | 11.2 | 0.6 | more than 5000 | 200 | 310 | 100/100 |
| (16)[4)] | 80 | A 5 | 60 | 0.9 | Zn salt | 18.6 | 1.2 | more than 5000 | 220 | 350 | 100/100 |

Note to Table 1.
[1)]Amount in parts by weight for 100 parts by weight of the urethane resin.
[2)]A represents γ-methacryloxypropyltrimethoxysilane.
B represents γ-mercaptopropyltrimethoxysilane.
C represents γ-aminopropyltrimethoxysilane.
[3)]The urethane resin was replaced with an epoxy resin.
[4)]The urethane resin was replaced with an acrylic resin.
[5)]Average particle diameter in μm.

Electrocoating was carried out using a cationic electrocoating paint under the following conditions.
Electrocoating voltage: 200 V
Transition time: 30 seconds
Period of electrocoating: 2.5 minutes
Baking: at 170° C. for 20 minutes
The electrocoating film was visually inspected for craters on the film surface. The results are indicated in terms of voltage at which craters occur.
Corrosion resistance after working
Each coated sample was worked using a draw bead tester shown in FIG. 1, at a tensile rate of 300 mm/min and an elongation of 20%. The worked sample underwent the salt spray test which consists of 200 cycles of spraying salt water at 35° C. for 4 hours, drying at 60° C. for 2 hours, and wetting at 50° C. for 2 hours, one cycle taking 8 hours. After the salt spray test, the samples were cleaned of rust and the depth of corrosion was measured using a dial gauge.
Film adhesion Example 2

A 0.8 mm thick cold rolled steel sheet, which had undergone degreasing and pickling in the usual way, was electroplated with Zn—Ni alloy (20 g/m$^2$) using a sulfuric acid bath.

One part of the electroplated steel sheet underwent chromate treatment which consisted of the application of an aqueous solution of 40 wt % reduced chromic acid, followed by oven drying at 150° C. for 1 minute, with the total chromium amount being 40–80 mg.

Both the Zn—Ni alloy plated steel sheet (without chromate treatment) and the plated and chromate-treated steel sheet were coated with a urethane resin solution using a bar coater to form a coating film thinner than 2 μm, which was subsequently baked at 180° C. for 1 minute. Thus there were obtained two kinds of resin coated steel sheets. The urethane resin solution contains a silane coupling agent or colloidal silica, a phosphate, and an organic pigment fine powder as shown in Table 2. The samples were evaluated in the same manner as in Example 1. The results are shown in Table 2.

TABLE 2

| Run No. (Comparative run No.) | Amount of chromium (mg/m$^2$) | Silane coupling agent (pbw)[1)2)] | Colloidal silica (pbw)[1)] | Amount of resin coating film (g/m$^2$) | Phosphate Kind | Conc. (%) | Size (μm)[5)] |
|---|---|---|---|---|---|---|---|
| 1 | — | A 5 | 20 | 0.5 | Ca salt | 0.01 | 3.0 |
| 2 | 70 | A 10 | 20 | 0.6 | Fe salt | 0.50 | 1.8 |
| 3 | 40 | A 30 | 20 | 0.1 | Ba salt | 1.25 | 2.3 |
| 4 | 10 | B 20 | 10 | 1.0 | Co salt | 5.70 | 0.9 |
| 5 | 150 | B 30 | 30 | 0.7 | Mg salt | 10.3 | 0.6 |

TABLE 2-continued

| | | | | | | | |
|---|---|---|---|---|---|---|---|
| 6 | 120 | B 20 | 25 | 0.5 | Mn salt | 17.6 | 1.4 |
| 7 | 100 | C 20 | 60 | 0.3 | Zn salt | 21.2 | 2.4 |
| 8 | 80 | C 30 | 40 | 0.9 | Al salt | 34.8 | 0.5 |
| (9) | 70 | A 10 | 50 | 0.9 | — | — | — |
| (10) | 80 | A 20 | 30 | 0.8 | — | — | — |
| (11) | 100 | B 5 | 15 | 1.0 | K salt | 10.0 | 1.2 |
| (12) | 80 | B 20 | 30 | 0.8 | Mg salt | 0.008 | 2.4 |
| (13) | 70 | B 40 | 20 | 0.6 | Fe salt | 36.8 | 0.5 |
| (14) | 90 | C 20 | 40 | 0.7 | Mg salt | 23.6 | 3.2 |
| (15) | 40 | C 30 | 20 | 1.0 | Al salt | 5.0 | 1.8 |
| (16) | 120 | B 25 | 30 | 0.6 | Co salt | 14.8 | 0.6 |
| (17) | 110 | C 35 | 40 | 0.7 | Mn salt | 30.2 | 1.2 |
| (18) | 50 | C 40 | 50 | 0.05 | Zn salt | 12.0 | 2.6 |
| (19) | 100 | A 10 | 70 | 1.2 | Co salt | 24.0 | 1.1 |
| (20)[3] | 90 | A 40 | 80 | 0.7 | Mg salt | 11.2 | 0.6 |
| (21)[4] | 80 | A 5 | 60 | 0.9 | Zn salt | 18.6 | 1.2 |

| Run No. (Comparative run No.) | Organic pigment | | | Number of spot weld points | Electro-coatability (V) | Corrosion resistance after working ($\mu$m) | Film adhesion |
|---|---|---|---|---|---|---|---|
| | Kind | Conc. (%) | Size ($\mu$m) | | | | |
| 1 | Naphthol type | 21.1 | 0.5 | more than 5000 | 280 | 150 | 100/100 |
| 2 | Diazo type | 40.0 | 0.01 | more than 5000 | 260 | 50 | 100/100 |
| 3 | Cyanine type | 34.8 | 0.8 | more than 5000 | 260 | 80 | 100/100 |
| 4 | Cyanine type | 10.3 | 1.0 | more than 5000 | 280 | 90 | 100/100 |
| 5 | Dioxazine type | 0.5 | 0.6 | more than 5000 | 260 | 70 | 100/100 |
| 6 | Disazo type | 5.7 | 0.4 | more than 5000 | 260 | 60 | 100/100 |
| 7 | Quinacridone type | 0.01 | 0.5 | more than 5000 | 260 | 70 | 100/100 |
| 8 | Naphthol type | 1.25 | 0.03 | more than 5000 | 260 | 60 | 100/100 |
| (9) | — | — | — | less than 2000 | 220 | 80 | 100/100 |
| (10) | Disazo type | 3.2 | 0.7 | 2000–5000 | 260 | 90 | 100/100 |
| (11) | Naphthol type | 24.2 | 0.4 | less than 2000 | 240 | 110 | 98/100 |
| (12) | Cyanine type | 13.6 | 0.7 | less than 2000 | 260 | 130 | 98/100 |
| (13) | Disazo type | 35.3 | 0.9 | more than 5000 | 220 | 360 | 65/100 |
| (14) | Cyanine type | 1.7 | 1.0 | more than 5000 | 180 | 240 | 68/100 |
| (15) | TiO$_2$ | 16.3 | 0.5 | more than 5000 | 180 | 280 | 85/100 |
| (16) | Naphthol type | 0.009 | 0.9 | more than 5000 | 160 | 370 | 75/100 |
| (17) | Dioxazine type | 40.7 | 0.8 | more than 5000 | 180 | 320 | 95/100 |
| (18) | Diazo type | 33.2 | 1.5 | more than 5000 | 180 | 380 | 95/100 |
| (19) | Cyanine type | 18.6 | 0.1 | less than 2000 | 240 | 15 | 100/100 |
| (20)[3] | Cyanine type | 11.2 | 0.6 | more than 5000 | 200 | 310 | 100/100 |
| (21)[4] | Naphthol type | 24.0 | 0.5 | more than 5000 | 220 | 350 | 100/100 |

Note to Table 2.
[1]Amount in parts by weight for 100 parts by weight of the urethane resin.
[2]A represents $\gamma$-methacryloxypropyltrimethoxysilane.
B represents $\gamma$-mercaptopropyltrimethoxysilane.
C represents $\gamma$-aminopropyltrimethoxysilane.
[3]The urethane resin was replaced with an epoxy resin.
[4]The urethane resin was replaced with an acrylic resin.
[5]Average particle diameter in $\mu$m.

What is claimed is:

1. A resin-coated steel sheet wherein the steel sheet is coated with 0.1–1.0 g/m$^2$ of a resin film consisting essentially of:
   (i) a urethane resin,
   (ii) 0.01–35 wt % of a metal phosphate of Al, Ba, Ca, Co, Fe, Mg, Mn, or Zn based on the weight of said urethane resin, wherein said metal phosphate has an average particle diameter of $\leq 3$ $\mu$m, either
   (iiia) 5–80 wt % colloidal silica, based on the weight of said urethane resin, or
   (iiib) 1–40 wt % of a silane coupling agent, based on the weight of said urethane resin and, optionally,
   (iv) 0.01–40 wt % of an organic pigment based on the weight of said urethane resin, wherein said organic pigment has an average particle diameter of $\leq 1.0$ $\mu$m.

2. The resin-coated steel sheet according to claim 1, wherein the resin-coating is formed on a layer of zinc-plating or zinc-alloy plating.

3. A resin-coated steel sheet according to claim 2, wherein said layer of zinc plating or zinc-alloy plating is coated with 10–150 mg/m$^2$ of a chromate film.

4. The resin-coated steel sheet according to claim 3, wherein said chromate film is present in from 30–80 mg/m$^2$.

5. The resin-coated steel sheet according to claim 1, wherein said resin fiber contains said silane coupling agent, which agent is selected from the group consisting of $\gamma$-mercaptopropyltrimethoxysilane and $\gamma$-aminopropyltrimethoxysilane.

6. The resin-coated steel sheet according to claim 1, wherein said urethane resin is an aqueous urethane resin containing hydrophilic groups.

7. The resin-coated steel sheet according to claim 1, wherein said resin film contains said colloidal silica.

8. A resin-coated steel sheet wherein the steel sheet is coated with 0.1–1.0 g/m$^2$ of resin consisting of:
   (i) a urethane resin,
   (ii) 0.01–35 wt % of a metal phosphate of Al, Ba, Ca, Co, Fe, Mg, Mn, or Zn based on the weight of said urethane resin, wherein said metal phosphate has an average particle diameter of $\leq 3$ $\mu$m, either
   (iiia) 5–80 wt % colloidal silica, based on the weight of said urethane resin, or
   (iiib) 1–40 wt % of a silane coupling agent, based in the weight of said urethane resin, and, optionally,
   (iv) 0.01–40 wt % of an organic pigment, based on the weight of said urethane resin, wherein said organic pigment has an average particle diameter of $\leq 1.0$ $\mu$m.

9. The resin-coated steel sheet according to claim 8, wherein said resin coating is formed on a layer of zinc-plating or zinc-alloy plating, said layer of zinc plating or zinc-alloy plating being first coated with 10–150 mg/m$^2$ of a chromate film.

* * * * *